United States Patent [19]
Yoshigai

[11] Patent Number: 5,060,534
[45] Date of Patent: Oct. 29, 1991

[54] QUICK RELEASE DEVICE FOR BICYCLE BRAKE

[75] Inventor: Kenichi Yoshigai, Osaka, Japan

[73] Assignee: Yoshigai Kikai Kinzoku Co., Ltd., Osaka, Japan

[21] Appl. No.: 512,180

[22] Filed: Apr. 20, 1990

[51] Int. Cl.$^5$ .................................................. F16C 1/20
[52] U.S. Cl. ................................ 74/502.2; 74/502.2; 74/502.4; 188/24.12; 188/24.21
[58] Field of Search .................. 74/502.2, 502.4, 502.6, 74/501.5 R; 188/2 D, 24.12, 24.21, 24.22, 24.19

[56] References Cited

U.S. PATENT DOCUMENTS

| | | | |
|---|---|---|---|
| 4,009,768 | 3/1977 | Fujii | 188/24.22 |
| 4,143,745 | 3/1979 | Yoshikawa | 188/24.21 |
| 4,552,251 | 11/1985 | Schoch | 188/24.21 |
| 4,591,026 | 5/1986 | Nagano | 188/24.22 |
| 4,718,521 | 1/1988 | Hosokawa | 188/24.19 |
| 4,850,456 | 7/1989 | Chi | 74/502.4 |

FOREIGN PATENT DOCUMENTS

| | | | |
|---|---|---|---|
| 8812 | 3/1980 | European Pat. Off. | |
| 433607 | 4/1948 | Italy | 188/24.21 |

Primary Examiner—Rodney M. Lindsey
Assistant Examiner—F. Saether
Attorney, Agent, or Firm—Sixbey, Friedman, Leedom & Ferguson

[57] ABSTRACT

Suspension wires of a bicycle brake are connected to the upper ends of a pair of brake arms (i.e., right and left brake arms) which are loosely pivotally mounted to a bicycle bodyo and are equipped with brake shoes, and the suspension wires are connected to a lower end of a Bowden cable for operating the brake via a hanger. The upper end of each suspension wire is connected to the hanger by means of a release lever. The lower end of this lever is pivotallyl mounted to the lower end of the hanger by means of a pin. Also, the upper end of the suspension wire is connected to an intermediate portion of the lever, and the pin is located outside the upper end of the suspension wire while the upper end of the lever lies against a respective side of a fastener when the brake is set.

2 Claims, 2 Drawing Sheets

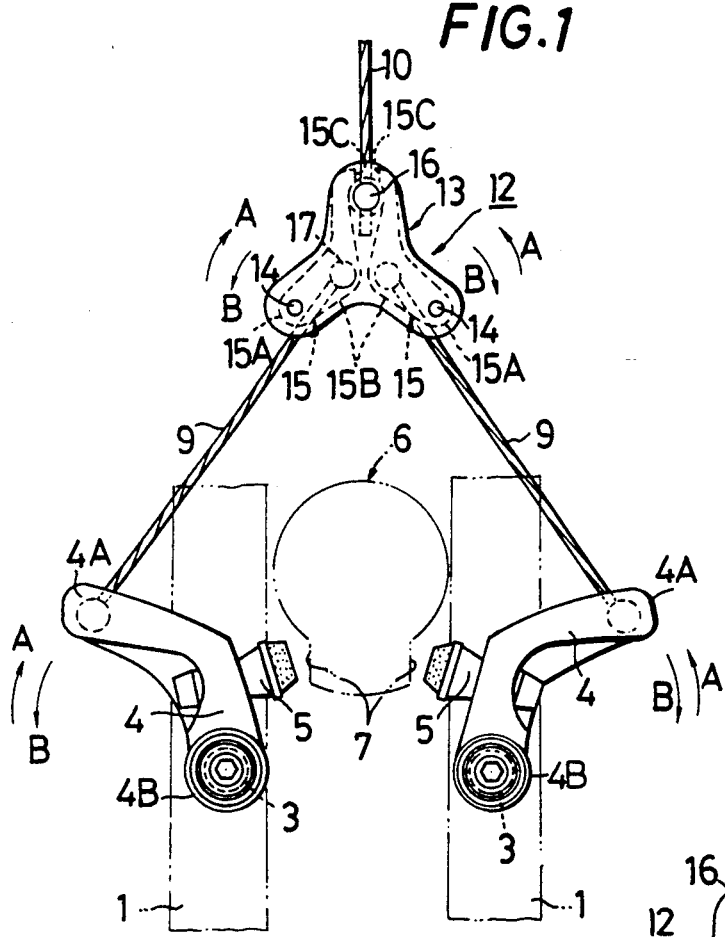
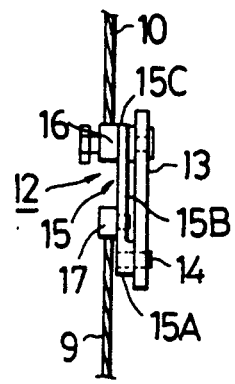
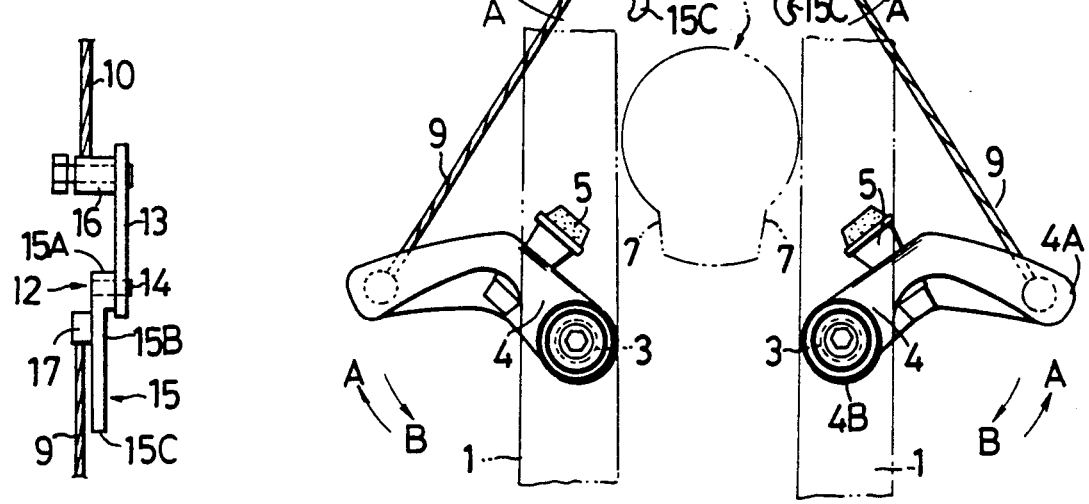

QUICK RELEASE DEVICE FOR BICYCLE BRAKE

FIELD OF THE INVENTION AND RELATED ART STATEMENT

This invention relates to a quick release device to release brake in a bicycle brake device.

In a conventional cantilever type brake mounted to a bicycle, which can be freely disassembled and assembled, as shown in FIGS. 5 and 6, a pair of (right and left) cantilever type brake arms 4 are respectively mounted to the shaft 3, loosely pivotally on said shaft 3, of a mounting pedestal 2 secured to a bicycle body, or particularly to a front fork 1. Said arm 4 is provided with a return spring 8, which always applies an inverting force to said arm 4 in such a direction that a brake shoe 5 attached to the brake arm 4 separates from the rim 7 of a wheel 6. The both ends of a suspension wire 9 are removably attached to the upper end 4A of the brake arm 4, and the suspension wire 9 is suspended by a hanger 11, which is connected to the end of a Bowden cable 10 for operating the brake. Lifting the Bowden cable 10 by grasping the brake lever (not shown) rotates the brake arm 4 around the shaft 3 in the direction of the arrow A in the figure, allowing the brake shoe 5 to come into contact with the rim 7 for braking. Releasing said brake lever lowers the hanger 11 to the original position before operation, and the brake arm 4 turns over by the lowering of the hanger 11 in the direction of the arrow B in the figure by the energizing force of the return spring 8 to separate the brake shoe 5 from the rim 7.

In sport bicycles and motocross bicycles, however, the wheel 6 is removed from the bicycle body when dissassembled for transport. In this case, the spacing between the brake shoes 5 should be expanded to take out the wheel 6. In the above prior art, however, the suspension wire 9 should be removed form the brake arm 4, and this work is troublesome and requires time. Also since the brake should be adjusted to assemble the bicycle again, it also takes a lot of time.

OBJECTS AND SUMMARY OF THE INVENTION

It is an object of the present invention to provide a quick release device for bicycle brake, which is capable of simply obtaining a released state of the brake; that is, a state in which the spacing between the brake shoes of a pair of brake arms has been expanded by means of a single touch operation, and in which it is easy to take out the wheel due to the widely expanded spacing between the brake shoes, and re-assembly is easy without requiring any brake adjustment.

To achieve the above objects, the present invention used the following technical means:

That is, in a bicycle brake, in which suspension wires are connected to the upper ends of a pair of (right and left) brake arms which are loosely pivotally mounted to the bicycle body and are equipped with brake shoes, and the suspension wires are connected to the lower end of a Bowden cable for operating the brake by means of a hanger, the present invention comprises:

At least either one or the other end of each suspension wire connected to said each brake arm is connected to a hanger by means of a release lever, the lower end of which is pivotally mounted to the lower end of the hanger by means of a pin and, the upper end of the suspension wire being connected to the intermediate portion of the release lever. The pin is located outside the upper end of the suspension wire when the brake is set.

According to the present invention, to release the brake, the operator presses outwardly the upper end of the release lever to rotate it until the top of the suspension wire moves outside the pin. Then, the brake arm rotates downward around the shaft by the elastic force of the return spring, and at the same time, the release lever turns over downward to cause the brake shoes to rotate outwardly relative to each other, and as a result, the spacing between them is widely expanded. Accordingly, the wheel can be easily taken out from the bicycle body.

To assemble the bicycle, after attaching the wheel to the bicycle body 1, rotating upward the top end of the release lever is rotated outwardly to restore the brake arm to the brake set condition. No brake adjustment is required.

Also, according to the present invention, on repairing a flat tire and performing other work, as well as for releasing the brake for bicycle disassembly, a simple single touch operation of only rotating downward the release lever easily enables brake release. Also, since the release lever does not rotate by itself, any unexpected release accident can be prevented. During bicycle assembly and the like, the brake can be also set by a simple single touch operation of only rotating the release lever 15, and moreover, does not have to be readjusted. This can be obtained at low cost because of the very simple construction and easy assembly.

BRIEF DESCRIPTION OF THE DRAWINGS

FIG. 1 to FIG. 4 show a preferred embodiment of the present invention.

FIG. 1 is a front view of a quick release mechanism during brake setting;

FIG. 2 is a side view of the principal part of the FIG. 1 mechanism:

FIG. 3 is a front view of the mechanism while the brake is released; and

FIG. 4 is a side view of the principal part as shown in FIG. 3.

DESCRIPTION OF THE PREFERRED EMBODIMENT

Figure 6:
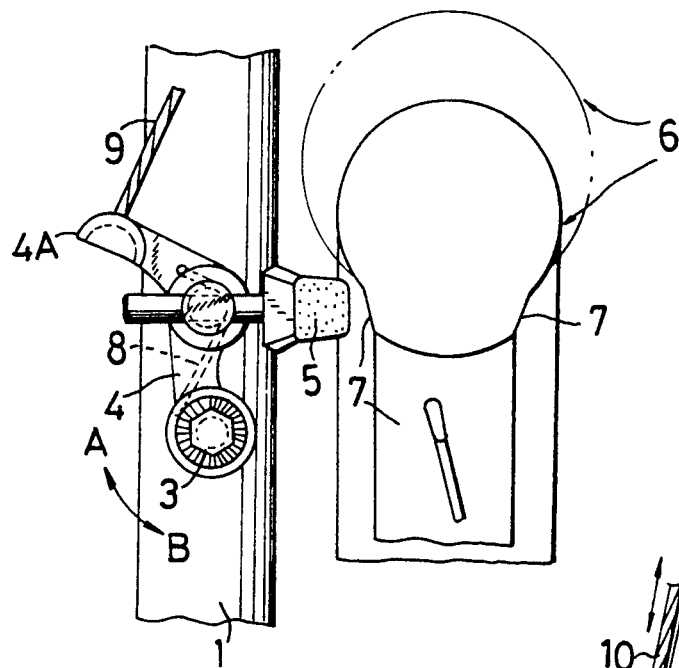
FIG. 5 and FIG. 6 are a perspective view and fragmentary front view, respectively, showing a conventional brake.

Referring to the drawings, the embodiments of the present invention will be described.

Figure 5:
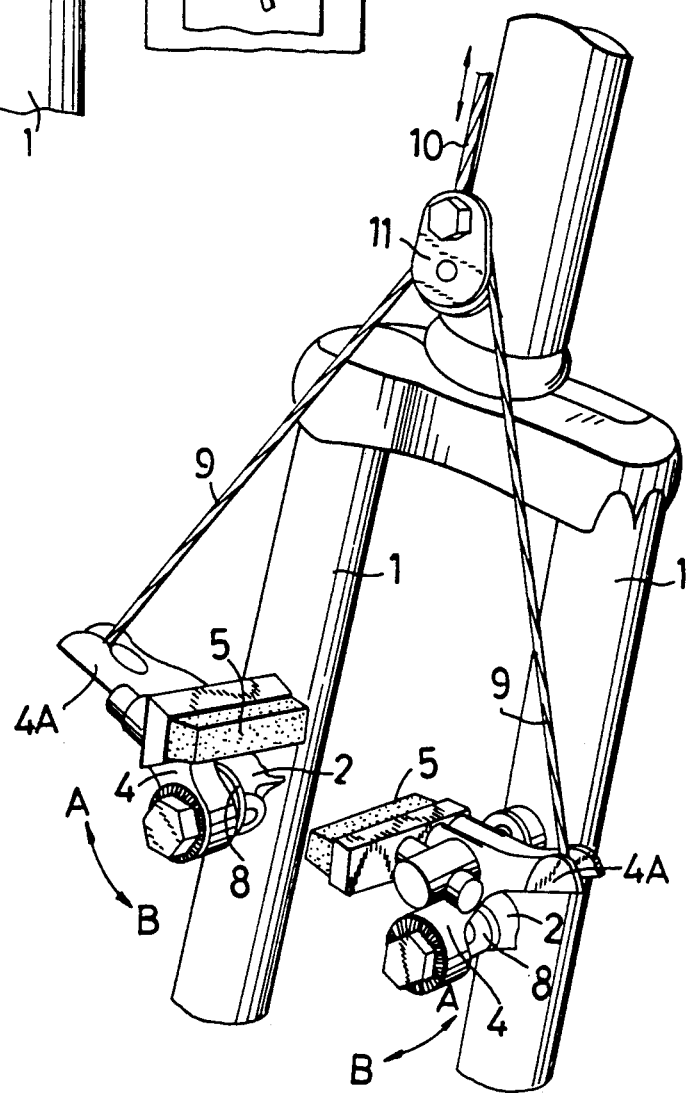

FIG. 1 to FIG. 4 show a preferred embodiment of this invention, and the invention is different from the cantilever type brake shown in FIGS. 5 and 6 only in the hanger and connection to the suspension wire, and has mostly the same configuration. For the portions already explained, therefore, the same signs and names are used and detailed explanations are omitted. This invention also can, of course, apply to the center-pull type caliper brake.

The quick release device 12 consists of the hanger 13 and the release lever 15, which is pivotally mounted to said hanger 13 by means of the pin 14, and the upper ends of both (right and left) suspension wires 9 are connected to the hanger 13 through the release lever 15.

The hanger 13 consists of a nearly triangular laminar body as viewed from the front, and its upper end is connected to the lower end of the Bowden cable 10 by means of a fastener 16, and the both ends (right and left) of the bottom are connected to the lower ends 15A of the release lever 15 by means of said pin 14 respectively.

Each release lever 15 is nearly L-shaped as viewed from the front, and the angle of bend, that is, intermediate portion 15B is connected to the upper end of each suspension wire 9 by means of a clasp 17 respectively, and this clasp 17 is pivotally secured to the release lever 15. Each top end 15C of said lever 15 comes into contact with the both sides (left and right) of said fastener 16 when the brake is set. At this time, each pin 14 is located outside the top end of the suspension wire 9, and the suspension wire 9 is pulled in the direction of the arrow B in FIGS. 1 and 3 by the energizing force of said return spring 8 (corresponds to the return spring in FIGS. 5 and 6 though not shown). Therefore, the top end 15C of said lever is strongly pressed. Accordingly, if the top end 15C of the release lever 15 is not forcibly rotated in the direction of the arrow B in the state shown in FIGS. 1 and 2, the release lever 15 does not turn over by itself, but the brake set condition can be maintained.

Although it is not shown, said return spring is built in the bearing boss 4B of the brake arm 4, and has the same function as that of the return spring 8 in FIGS. 5 and 6. This can be, of course, used as the return spring 8 in FIGS. 5 and 6.

In the above embodiment, to release the brake on disassembling the bicycle, the top ends 15C of the release levers 15 are pressed outward to rotate the levers around the pins 14 in the direction of the arrow B in FIG. 1. The moment that the top end of the suspension wire 9 is located outside the pin 14, at this time, the release lever 15 turns over and rotates, by the energizing force of the return spring 8, together with the brake arm 4 into the state shown in FIGS. 3 and 4. The spacing between brake shoes 5 widely expands, and the wheel 6 can be easily taken out even if a wide tire is put on the wheel.

When setting the brake after assembling the bicycle again, the top end 15C of the release lever 15 is rotated in the direction of the arrow A in the state shown in FIG. 3, to allow it to come into contact with the both sides (right and left) of the fastener 16 as shown in FIG. 1. No brake adjustment is required.

Although the release lever 15 is used to connect to the right and left suspension wires 9 in the above embodiment, this release lever 15 may be connected to either one of the right and left suspension wires, with the top end of the other suspension wire 9 directly connected with the lower end of the hanger 13 by means of the clasp 17.

Also although the top end 15C of the release lever 15 is allowed to come into contact with the fastener 16 in the above embodiment, a stopper may be separately provided to allow it to come into contact.

This invention is not limited to the constructions of above embodiments.

What is claimed is:

1. In a bicycle brake, in which suspension wires are connected to upper ends of a pair of brake arms which are loosely pivotally mounted to a bicycle body and are equipped with brake shoes, and the suspension wires are connected by a fastener to a lower end of a Bowden cable for operating the brake by means of a hanger in the form of a nearly triangular laminar body, as viewed from the front, a quick release device for bicycle brakes, wherein: one end of each suspension wire is connected to the hanger by means of a release lever; a lower end of each said lever is pivotally mounted to a bottom end of the hanger by means of a pin, said pin being located outside the upper end of the suspension wire when the brake is set; each release lever is nearly L-shaped as viewed from the front, and an intermediate portion thereof is connected to the upper end of a respective suspension wire by means of a clasp, said clasp being pivotally secured to a respective release lever; and in which a top end of each release lever comes into contact with a respective side of the fastener when the brake is set.

2. In a bicycle brake of the type having a pair of brake arms loosely pivotally mounted to a bicycle body and equipped with brake shoes, a suspension wire connected to an upper end of each of said brake arms, a hanger connected to each suspension wire and to a lower end of a Bowden cable for operating the brake; and a quick release device for expanding the distance between the brake shoes, wherein said quick release device comprises:

a pair of release levers, a lower end of each release lever being freely pivotally connected to the hanger by a respective pivot pin, and a connector on each release lever by which an upper end of each suspension wire is connected to an intermediate portion of a respective release lever; wherein the release levers are pivotable between an inoperative position, in which each connector for the suspension wire is disposed below and to the outside of the respective pivot pin and the hanger, with the brake shoes being widely spread apart relative to a wheel rim, and an operational readiness position in which each release lever has been swung over top dead center relative to the respective pivot pin, thereby locating the connector for the respective suspension wire above and inwardly of the respective pivot pin, and causing a tension force to be applied to the release lever by the respective suspension wire as a means for holding an upper end of each release lever against a stop surface carried by the hanger.

* * * * *